United States Patent [19]

Kassai

[11] 4,111,446
[45] Sep. 5, 1978

[54] TRICYCLE FOR CHILDREN
[75] Inventor: Kenzou Kassai, Higashishimizu, Japan
[73] Assignee: Kassai Kabushiki Kaisha, Higashishimizu, Japan
[21] Appl. No.: 792,987
[22] Filed: May 2, 1977
[30] Foreign Application Priority Data
Jun. 25, 1976 [JP] Japan .................. 51-75846
[51] Int. Cl.² .................. B62K 9/02; B62J 1/02
[52] U.S. Cl. .................. 280/275; 280/282; 280/283
[58] Field of Search ........... 280/283, 282, 284, 274, 280/275, 259, 226 R, 279, 87.02, 87.03, 281 R; 297/208, 195

[56] References Cited
U.S. PATENT DOCUMENTS
2,173,520  9/1939  Klatt .................. 280/284 X FOREIGN PATENT DOCUMENTS
242,049  11/1925  United Kingdom ........ 280/284
1,373,313  11/1974  United Kingdom ........ 280/282
751,849  7/1956  United Kingdom ........ 280/282

*Primary Examiner*—Kenneth H. Betts
*Attorney, Agent, or Firm*—Browdy and Neimark

[57] ABSTRACT

This invention relates to a tricycle for children which comprises a main rod, handle rods provided at the front end of the main rod, a front wheel provided between the lower ends of the handle rods, a pair of rear legs pivotally provided at the back portion of the main rod by an attachment, a pair of rear wheels provided at the lower ends of the rear wheels respectively, and a spring which is provided between the back end of the main rod and the attachment.

1 Claim, 5 Drawing Figures

TRICYCLE FOR CHILDREN

BACKGROUND OF THE INVENTION

The present invention relates to a tricycle for children.

In the conventional tricycle for children shown in FIG. 1, a spring 52 is provided between a main rod 50 and a saddle 51. When a stone or the like on the road collides with the wheels of the tricycle, the force is absorbed by the spring 52 and it is comfortable to ride on the tricycle. In this conventional tricycle, however, there is the danger that one's finger may be clipped off by the spring 52. In addition the performance of the spring which absorbs the force from impinging objects is not good.

BRIEF SUMMARY OF THE INVENTION

Accordingly, it is an object of the present invention to provide a tricycle for children which it is very comfortable to ride on.

It is another object of the present invention to provide a tricycle for children which is of simple structure and of high safety.

Other and further objects, features and adrantages of the invention will appear more fully from the following description.

DETAILED DESCRIPTION OF THE PREFERRED EMBODIMENT

Figure 1:
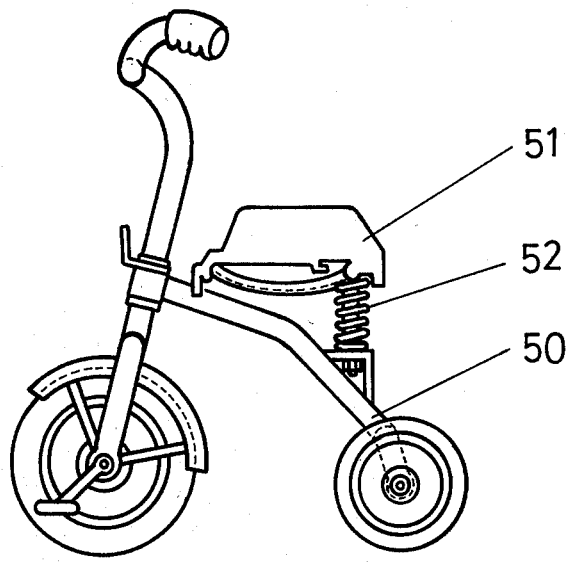
FIG. 1 is a side elevational view of the prior art of a tricycle for children.
Figure 2:
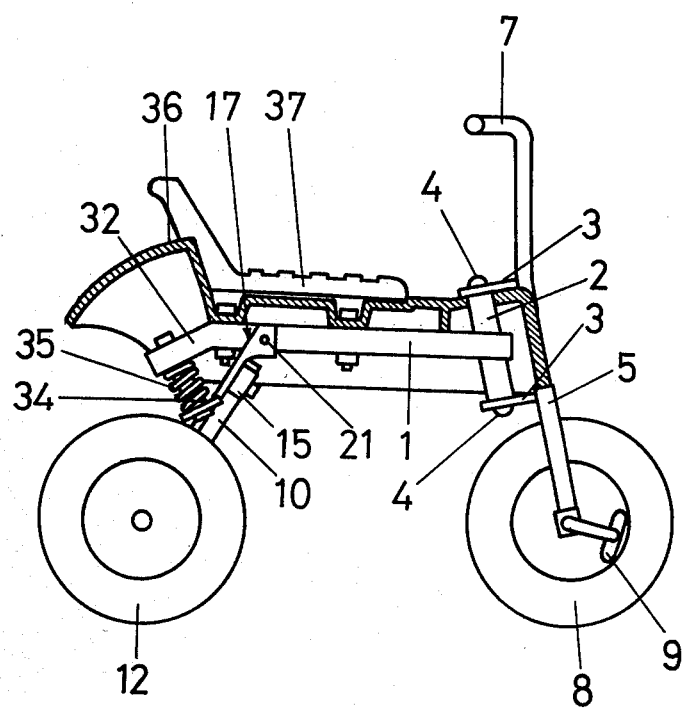
FIG. 2 is a side elevational view of one embodiment of a tricycle for children according to the present invention.
Figure 3:
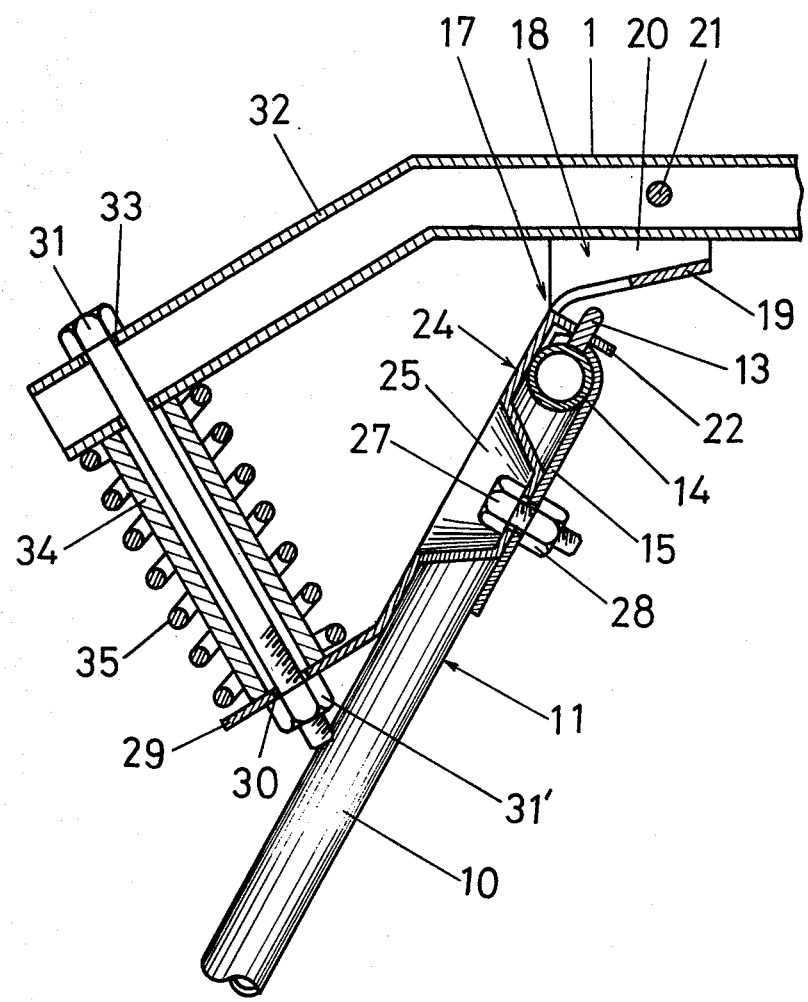
FIG. 3 is a partial enlarged cross sectional view thereof.
Figure 4:
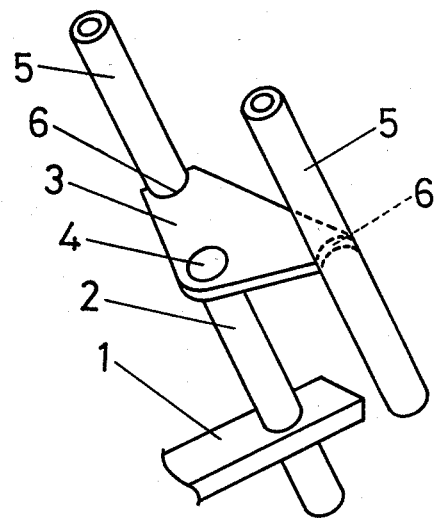
FIG. 4 is a partial enlarged perspective view thereof.
Figure 5:
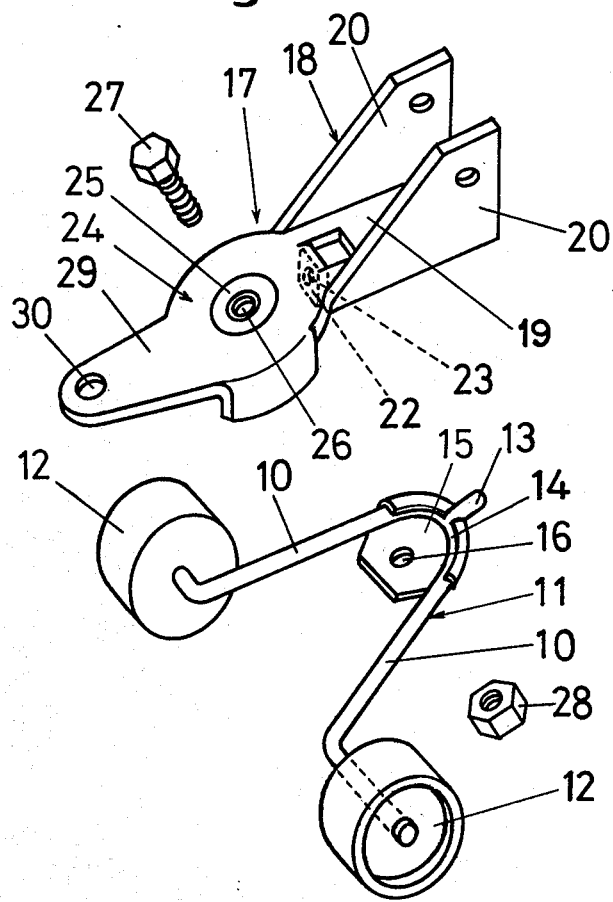
FIG. 5 is an enlarged perspective view of the attachment and rear legs thereof.

The present invention is described in detail hereinafter with reference to the drawings.

In FIGS. 2 to 5 inclusive, numeral 1 indicates a main rod, 2 indicates a cylinder which is provided perpendicularly fixed to the front portion of the main rod 1. The numeral 3 indicates an approximately triangular supporting plate which is pivotally provided at the upper or lower end of said cylinder 2 by a pin 4. The numeral 5 indicates a handle rod which is provided perpendicularly fixed to hollows 6,6 of the supporting plates 3,3. The numeral 7 indicates a handle which is formed by bending the upper end of the handle rod 5. The numeral 8 indicates a front wheel which is provided between the lower ends of the handle rods 5,5. The numeral 9 indicates a pedal which is pivotally provided at the outside of the lower end of the handle rod 5.

Further, numeral 10,10 indicate a pair of rear legs which are formed by bending a long rod 11. The numeral 12 indicates a rear wheel which is provided at the lower end of the rear leg 10. The numeral 13 indicates a projection provided on the central bend 14 of the long rod 11. The numeral 15 indicates a fan-shaped plate the circumference of which is woundly fixed to the central bend 14 of the long rod 11 but not to the projection 13. The numeral 16 indicates a hole in the fan-shaped plate 15. The numeral 17 indicates an attachment which connects the rear legs 10,10 pivotally to the main rod 1. The numeral 18 indicates a main rod attaching portion of the attachment 17 which, comprising a bottom plate 19 and side plates 20,20, is connected to the main rod 1 by a pin 21. The numeral 22 indicates an engaging plate which is downwardly attached to the bottom plate 19 of the main rod attaching portion 18. The numeral 23 indicates an engaging hole of the engaging plate 22. The numeral 24 indicates a circular rear leg attaching portion which is attached inclined downwardly to the bottom plate 19 at the back of main rod attaching portion 18. The numeral 25 indicates a circular hollow provided at the center of the rear leg attaching portion 24. The numeral 26 indicates a hole provided at the center of the circular hollow 25. The numeral 27 indicates a bolt which is inserted through the hole 26 of the circular hollow 25 of the rear legs attaching portion 24, and the hole 16 of the fan-shaped plate 15, and is tightened by a nut 28. The numeral The attachment 17 and the rear legs 10,10 are fixedly connected by the engagement of the bolt 27 and the nut 28, the central bend 14 of the long rod 11 being inserted below the rear legs attaching portion 24 of the attachment 17, and the circular hollow 25 being overlapped by the fan-shaped plate 15. The numeral 29 indicates a spring attaching portion provided at the back of the rear legs attaching portion 24 tilted slightly above the plane containing the rear legs attaching portion 24. The numeral 30 indicates a hole in the spring attaching portion 29. The numeral 31 indicates a bolt which is inserted through a hole 33 provided at the back end of a back bend 32 in the main rod 1 and the hole 30 of the spring attaching portion 29 of the attachment 17, and is tightened by a nut 31'. The numeral 34 indicates a rubber sleeve or collar which is provided surrounding the bolt 31 between the back bend 32 of the main rod 1 and the spring attaching portion 29. The numeral 35 indicates a spring which is provided surrounding the rubber sleeve or collar 34. The numeral 36 indicates a body provided on the main rod 1. The numeral 37 indicates a saddle provided on the body 36. In the next place, the operation and the features of the present invention are described.

It is provided that a child should ride on the saddle 37 of this tricycle. In this case, the attachment 17 and the rear legs 10,10 are fixedly connected because the projection 13 is engaged with the engaging hole 23 of the engaging plate 22, the central bend 14 of the rear legs 10,10 is inserted below the rear legs attaching portion 24 of the attachment 17, and the circular hollow 25 and the fan-shaped 15 are fixedly connected by the bolt 27 and the nut 28. So, when the weight of the child is applied to the main rod 1 through the saddle 37, the angle between the attachment 17 or the rear legs 10,10, and the main rod 1 becomes small because the angle between the attachment 17 and the rear legs 10,10 does not change. The back portion of the main rod 1 rotates a little downwardly, and the rear wheels 12,12 moves a little backward. Accordingly, the angle between the back bend 32 of the main rod 1 and the rear legs 10,10 becomes small and the spring 35 is compressed. So, when the tricycle runs on uneven road or when a stone or the like on the road collides with the wheels, force of the impingement is absorbed by the spring 35 and it is very comfortable to ride on this tricycle.

Especially, in this embodiment, the effect of absorbing the force of impingement of objects on the wheels is very good compared to the conventional one as shown in FIG. 1 wherein a spring 52 is provided between the main rod 50 and the saddle 51, because the impingement is absorbed by the up and downward movement of the main rod 1, the spring 35 being provided between the main rod 1 and the rear legs 10.

In addition, there is no danger that a finger will be clipped off by the spring 35 because the spring 35 is obstructed by the body 36, while the spring 52 of the conventional tricycle is exposed.

Furthermore, it is possible to obtain a variety of aesthetically superior tricycles at moderate prices by attaching different bodies to the same chassis of the tricycle, because it is possible to separate the body 36 and the chassis perfectly.

As described above, the present invention provides a tricycle which it is very comfortable to ride on, the performance of absorbing the force of impingement of objects on the wheels being very good. Also, the tricycle of the present invention is very safe because the spring is obstructed by the body thereof. Further, it is possible to obtain various kinds of aesthetically superior tricycles at moderate cost.

What is claimed is:

1. A tricycle for children comprising:
 a main frame comprising
  a main rod,
  handle rods attached to the front end of said main rod,
  a front wheel attached between the lower ends of said handle rods,
  a pair of rear legs pivotally connected to the back portion of said main rod, said rear legs comprising one continuous long bent rod,
  a pair of rear wheels connected to the back end of said main rod,
  a spring connected to the back end of said main rod;
 a projection attached to the central bend of said long bent rod;
 a fan-shaped plate fixed to the central bend of said long rod;
 an attachment comprising
  a main rod attaching portion having a bottom plate and sides plates between which said main rod is inserted,
  an engaging plate attached to said main rod attaching portion which engages said projection,
  a rear attaching portion which is attached to said main rod attaching portion and inclined thereto, and is fixedly connected to said fan-shaped plate,
  a bolt and a nut which fixedly connect said fan-shaped plate and said rear leg attaching portion of said attachment, and
  a spring attaching portion which is provided at the back of the said rear leg attaching portion so that said spring may be attached between the back end of said main rod and said spring attaching portion.

* * * * *